United States Patent [19]

Trahan et al.

[11] Patent Number: 4,585,467
[45] Date of Patent: Apr. 29, 1986

[54] PLUNGER SUITABLE FOR USE IN A GLASSWARE FORMING MACHINE

[75] Inventors: Albert J. Trahan, Vernon, Conn.; Vladimir Vajda, Nussbaumen, Switzerland

[73] Assignee: Emhart Industries, Inc., Farmington, Conn.

[21] Appl. No.: 714,781

[22] Filed: Mar. 22, 1985

[30] Foreign Application Priority Data

Apr. 6, 1984 [GB] United Kingdom ............... 8408998

[51] Int. Cl.⁴ .................................. C03B 11/10
[52] U.S. Cl. ......................... 65/172; 65/173; 65/234; 65/362
[58] Field of Search ............ 65/357, 359, 360, 362, 65/172, 173, 234, 361, 171

[56] References Cited

U.S. PATENT DOCUMENTS 2,161,255  6/1939  Howard ..................... 65/234 X
2,483,660 10/1949  Morris et al. ................ 65/171
3,305,344  2/1967  Colchagoff .................. 65/357

Primary Examiner—Arthur Kellogg
Attorney, Agent, or Firm—H. Samuel Kieser

[57] ABSTRACT

The plunger comprises a base portion adapted to be mounted on a piston rod and a tip portion which has a glass-engaging surface and a projection which enters a recess in the base portion. A generally cylindrical passage is defined by the base portion and the projection of the tip portion, the portion of the wall of the passage defined by the base portion being screw-threaded. A screw-threaded member is threadedly received in the passage and serves to retain the tip portion on the base portion by engaging a lip of the projection which projects across a portion of the passage.

3 Claims, 1 Drawing Figure

U.S. Patent  Apr. 29, 1986  4,585,467
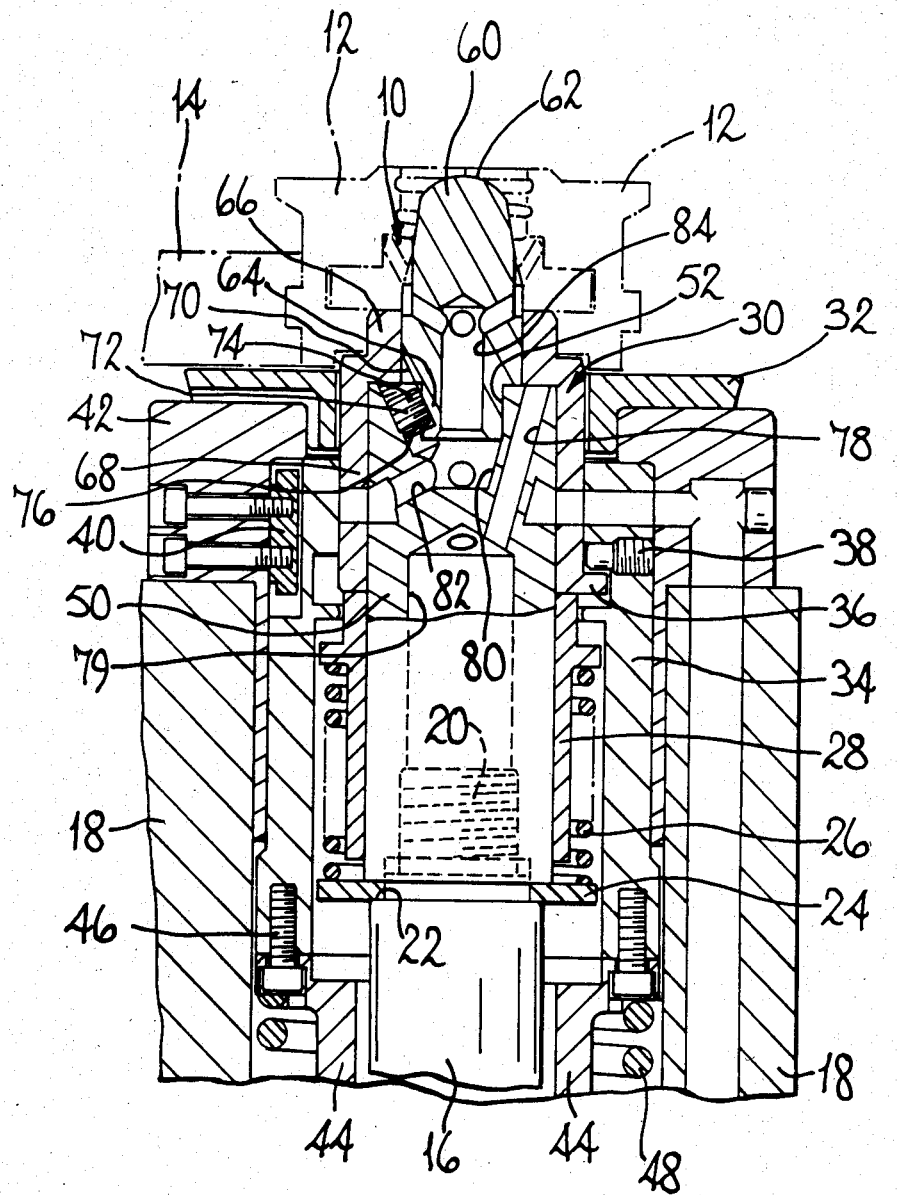

PLUNGER SUITABLE FOR USE IN A GLASSWARE FORMING MACHINE

BACKGROUND OF THE INVENTION

This invention is concerned with a plunger suitable for use in a glassware forming machine, for example a glassware forming machine of the individual section type, in forming parisons of molten glass for subsequent formation into an article of glassware. Although the invention is applicable to other types of glassware forming machines, it is described herein in relation to a glassware forming machine of the individual section type.

Glassware forming machines of the individual section type are well-known. These machines comprise a number of individual forming units, called "sections", which all receive gobs of molten glass from a common source and feed their output to a common conveyor. Each section comprises at least one parison-forming mould in which gobs of molten glass are formed into parisons and at least one blow mould in which the parisons are blown to the required shape.

Parisons are formed in a mould cavity of a parison-forming mould of a machine of the individual section type either by a pressing operation or by a blowing operation. In either case, a plunger mechanism is used.

A conventional plunger mechanism comprises a cylinder disposed below the parison mould, and a piston movable in the cylinder towards or away from the mould cavity upon the introduction of fluid under pressure into the cylinder. A piston rod projects from the piston towards the mould cavity and is arranged to carry a plunger so that movement of the piston causes movement of the plunger towards or away from the mould cavity. In a press-and-blow process in which the parison is formed by a pressing operation and the parison is subsequently blown, the piston is moved by air pressure to move the plunger into the mould cavity so that the plunger presses the glass to the shape of the cavity. Air under pressure is then used to move the plunger fully out of the mould cavity to allow the parison to be removed. Finally, the plunger is moved to an intermediate position, either by a spring compressed as the plunger was withdrawn from the cavity or by an auxiliary piston and cylinder assembly, and the next gob of molten glass is introduced into the mould cavity on top of the plunger. In a blow-and-blow process in which the parison is formed by a blowing operation and the parison is subsequently blown again, the plunger is directly mounted on the piston rod and is surrounded by a thimble which is spring urged towards the mould cavity. A further spring acts between the thimble and the piston rod. In operation, air pressure urges the plunger into the mould cavity into a load position in which a gob of molten glass is dropped on top of the plunger. The air pressure is then removed and the further spring aforementioned moves the plunger away from the mould cavity to a counter-blow position in which air (called counter blow air) can be blown past the plunger into the mould cavity to cause a parison to be formed therein. Air pressure is then used to pull the plunger and the thimble away from the mould cavity, compressing both springs. This brings the plunger to a position in which it is clear of the mould cavity so that the parison can be removed.

Since the plunger of a plunger mechanism contacts hot glass which is a very abrasive material, it is subject to wear and requires frequent replacement. This is undesirable because the plunger is a complex and, therefore, expensive item to manufacture, being made of expensive material. The plunger must have a glass-engaging surface of complex shape, a fitment by which it is mounted on the piston rod, and must define air passages for cooling air or counter blow air and/or removal of air from the mould.

It is an object of the present invention to provide a plunger in which the portion most susceptible to wear can be easily replaced without replacing the remainder of the plunger.

BRIEF SUMMARY OF THE INVENTION

The invention provides a plunger suitable for use in a glassware forming machine in forming parisons of molten glass for subsequent formation into an article of glassware, the plunger comprising a base portion adapted to be mounted on a piston rod of a piston and cylinder assembly to be moved by operation of the assembly into or out of a mould cavity in which the parison is formed, the base portion defining a recess which, when the base portion is mounted on a piston rod as aforesaid, opens towards the mould cavity, the plunger also comprising a tip portion having a surface arranged to engage molten glass in the mould cavity, and a projection which is adapted to be received in the recess of the base portion, wherein the base portion and the projection of the tip portion co-operate, when the projection of the tip portion is received in the recess of the base portion, in defining a generally cylindrical passage extending, from an opening, at a point where the tip portion emerges from the recess into the base portion and the projection of the tip portion, the portion of the wall of the passage which is defined by the base portion being formed with screw threads and the portion of the wall of the passage which is defined by the projection terminating in a lip of the projection which extends substantially transversely across a portion of the passage, and the plunger also comprising an externally-screw threaded member adapted to be inserted into the passage so that the thread of the member engages the threads of the wall of the passage so that the member is retained in the passage and the member engages the lip so that the member acts to retain the projection in the recess and hence the tip portion on the base portion.

In a plunger mechanism in accordance with the last preceding paragraph, the tip portion can be rapidly replaced by loosening the screw-threaded member in the passage, removing the tip portion, inserting the projection of a new tip portion into the recess in the base portion, and tightening the screw-threaded member in the passage defined by the base portion and the projection of the new tip portion. This can be accomplished quickly thereby minimising production losses while the machine is stopped to allow plunger replacement. The tip portion is significantly less expensive than an entire replacement plunger would be.

Since plungers contain air passages which are connected either to a source of cooling air or counter blow air, or to a vacuum source, it is advantageous if the base portion defines a chamber communicating with said recess, said chamber providing communication between air passages formed in the base portion and air passages formed in the tip portion.

BRIEF DESCRIPTION OF THE DRAWINGS

There now follows a detailed description, to be read with reference to the accompanying drawing, of a plunger which is illustrative of the invention. It is to be understood that the illustrative plunger has been selected for description by way of example and not of limitation of the invention.

The drawing is a vertical cross-section through the illustrative plunger showing it mounted on a plunger mechanism.

DETAILED DESCRIPTION OF PREFERRED EMBODIMENT OF THE INVENTION

The plunger mechanism on which the illustrative plunger is mounted forms part of a glassware forming machine of the individual section type. The illustrative plunger 10 is for use in the machine in forming a parison from molten glass contained in a cavity of a mould of the machine by a blowing process which forms part of a blow-and-blow process of manufacturing glassware. The mould cavity is formed by two mould side portions (not shown), a baffle (not shown), and two neck ring portions 12 (shown in broken line) which define a neck portion of the cavity and are mounted on an arm 14. The mould is of conventional construction and is used for forming parisons from gobs of molten glass, the parisons subsequently being transferred while held by the neck ring portions 12 to a further mould in which the parisons are blown to the shape of the required container.

The plunger mechanism comprises a vertically-extending piston and cylinder assembly (not shown) from the piston of which a hollow piston rod 16 extends vertically upwardly within a casing 18. An upper end portion 20 of the piston rod 16 is of a reduced diameter and is externally screw-threaded. A shoulder 22 of the piston rod 16 is formed around the portion 20 thereof and supports a washer 24. The washer 24 is engaged by a lower end of a spring 26 which acts between the washer 24 and a cylindrical thimble lock 28.

An upper end of the thimble lock 28 bears on a lower end of a thimble 30 which is slidable vertically in a ring 32 mounted on top of the casing 18. A lower end portion of the thimble 30 is received within a hollow cylindrical piston 34 within which the thimble lock 28 is contained. A lower end portion of the thimble 30 has an interrupted flange 36 which in one orientation of the thimble 30 about a central vertical axis thereof extends beneath a retaining screw 38 mounted on the piston 34 but which another orientation thereof can pass upwardly through slots (not shown) in the piston 34. The piston 34 is prevented from turning about a vertical axis by a key 40 which is mounted on a cap 42 fastened to the casing 18 and is received in a slot in the piston 34.

A downwards extension 44 of the piston 34 is fastened thereto by bolts 46. This extension 44 extends beneath the washer 24 around the piston rod 16 and is urged upwardly by a spring 48 which also bears on the top of the upper end cap (not shown) of the cylinder of the above-mentioned piston and cylinder assembly.

The illustrative plunger comprises a base portion 50 which has a bottom portion which is hollow, open at the bottom, and internally screw-threaded. The base portion 50 is thus adapted to be mounted on the piston rod 16 with the portion 20 of the piston rod 16 threadedly-received in the hollow portion of the base portion 50. The base portion 50 defines an upwardly-opening recess 52 which is generally cylindrical and, when the base portion 50 is mounted on the piston rod 16, opens towards the mould cavity.

The illustrative mould cavity also comprises a tip portion 60 having a surface 62 which is arranged to engage molten glass in the mould cavity. The tip portion 60 also has a generally-cylindrical downwards projection 64 which is of slightly smaller diameter than the recess 52 of the base portion 50 so that the projection 64 is adapted to be received in the recess 52. The tip portion 60 is guided in an upper cylindrical portion 66 of the thimble 30 while the base portion 50 is guided in a lower cylindrical portion 68 of the thimble 30.

The base portion 50 and the tip portion 60 co-operate, when the projection 64 is received in the recess 52, in defining a generally cylindrical passage 70 extending, from an opening at a point where the tip portion 60 emerges from the recess 52, into the base portion 50 and the projection 64 of the tip portion 60. The passage 70 extends downwardly at an angle of inclination of approximately 25° to the central longitudinal axis of the plunger, although its angle of inclination may suitably be between 20° and 30°. The portion of the wall of the passage 70 which is defined by the base portion 50 is formed with screw threads (the threads are not continued on the portion of the wall formed by the projection 64). The portion of the passage 70 formed by the projection 64 terminates in a lip 76 of the projection 64 which extends substantially transversely across a portion of the passage 70. The plunger 10 also comprises an externally screw-threaded member 72 adapted to be inserted into the passage 70. The thread of the member 72 engages the threads of the wall of the passage 70 formed on the base portion 50. Thus, the member 72 is retained in the passage 70. When the member 72 is screwed to the bottom of the passage 70, it retains the tip portion 60 on the base portion 50 by engaging the lip 76 and preventing withdrawal of the projection 64 from the recess 52. The member 72 has a slot 74 therein so that a screwdriver can be used to move it into or out of the passage 70, alternatively an Allen key arrangement may be used.

In order to exchange the tip portion 60 for a replacement when it becomes worn, the thimble 30 is removed by turning it until its flange 36 will pass upwardly through the aforementioned slots in the piston 34, a screwdriver is used to loosen the member 72 in the passage 70, the worn tip portion 60 is removed, a new tip portion 60 is positioned so that it co-operates with the base portion 50 in defining the passage 70, the member 72 is tightened in the passage 70, and the thimble 30 is replaced.

In the operation of the plunger mechanism, the piston and cylinder assembly is used to pull the piston rod 16 downwards to remove the plunger 10 from the mould cavity. This causes the washer 24 to engage the piston extension 44 and move it downwards compressing the spring 48. This allows a completed parison to be transferred. Next, the assembly is used to press the plunger 10 upwardly into the mould cavity. The plunger 10 now moves into the position shown in the drawing, the thimble 30 being held up by the spring 48 and the spring 26 being compressed. In this position, a gob of molten glass is dropped on to the plunger 10 within the mould cavity. Next, the air pressure is removed from the piston and cylinder assembly so that the spring 26 pushes the plunger 10 downwardly relative to the thimble 30. This allows air to be blown past the plunger 10 into the mould cavity through passages 78 in the base portion 50 which communicate with a passage through the piston rod 16 via a cylindrical chamber 79 formed in the base portion 50.

The base portion 50 of the plunger 10 also defines a chamber 80 which communicates with the recess 52. The chamber 80 provides communication between vacuum passages 82 formed in the base portion 50 and a vacuum passage 84 formed in the tip portion 60.

We claim:

1. A plunger suitable for use in a glassware forming machine in forming parisons of molten glass for subsequent formation into an article of glassware, the plunger comprising a base portion adapted to be mounted on a piston rod of a piston and cylinder assembly to be moved by operation of the assembly into or out of a mould cavity in which the parison is formed, the base portion defining a recess which, when the base portion is mounted on a piston rod as aforesaid, opens towards the mould cavity, the plunger also comprising a tip portion having a surface arranged to engage molten glass in the mould cavity, and a projection which is adapted to be received in the recess of the base portion, wherein the base portion and the projection of the tip portion co-operate, when the projection of the tip portion is received in the recess of the base portion, in defining a generally cylindrical passage extending, from an opening at a point where the tip portion emerges from the recess into the base portion and the projection of the tip portion, the portion of the wall of the passage which is defined by the base portion being formed with screw threads and and the portion of the wall of the passage which is defined by the projection terminating in a lip of the projection which extends substantially transversely across a portion of the passage, and the plunger also comprising an externally-screw threaded member adapted to be inserted into the passage so that the thread of the member engages the threads of the wall of the passage so that the member is retained in the passage and the member engages the lip so that the member acts to retain the projection in the recess and hence the tip portion on the base portion.

2. A plunger according to claim 1, wherein the base portion defines a chamber communicating with said recess, said chamber providing communication between air passages formed in the base portion and air passages formed in the tip portion.

3. A plunger according to claim 1, wherein the passages extends at an angle of between 20° and 30° to a central longitudinal axis of the plunger.

* * * * *